Patented Dec. 7, 1943

2,336,254

UNITED STATES PATENT OFFICE 2,336,254

COCOA PRODUCT AND PROCESS OF MAKING THE SAME

Carter F. Jones and Walter Tresper Clarke, Brooklyn, and Benjamin J. Zenlea, Ozone Park, N. Y., assignors to Rockwood & Co., Brooklyn, N. Y., a corporation of Delaware No Drawing. Application March 20, 1941, Serial No. 384,344

9 Claims. (Cl. 99—23)

This invention relates to a soluble cocoa product and to processes of manufacturing the same.

The purpose of the invention is to produce a stable sweetened cocoa product which is non-hygroscopic and which is readily soluble in cold milk or other potable liquids, said product being in the form of small discrete granular particles. Said product is further characterized by its free-flowing property and its easy and rapid wettability in cold milk or other cold liquids when mixed therewith. In brief, the cocoa product thus characterized readily dissolves or is capable of being finely suspended in cold milk or other potable liquids in which condition it remains, without settling, for a relatively long period of time.

In accordance with the present invention, the cocoa product having the above described characteristics is produced from sugar, preferably sucrose, and pulverized cocoa or cocoa powder having a very low cocoa butter fat content, i. e., a fat content not substantially exceeding about 2%. The provision in the product of cocoa powder having a low fat content is an important feature of the present invention, as we have found that this contributes greatly to the wettability and solubility of the cocoa product in cold milk or other liquid, due probably to the fact that there is eliminated any film or coating of fat which, if present, would prevent access of the liquid to the cocoa matter and sugar and thereby greatly interfere with or prevent the wettability and solubility of the particles of the product in cold milk. Another important feature of the present invention resides in the use of a small proportion of water, as a result of which the sugar which is dissolved in heated water as hereinafter described rapidly crystallizes in the form of very small sugar crystals when the sugar syrup is cooled.

To give more specific examples by which the desired results may be accomplished, we describe the methods outlined below:

Method I

In one method of manufacturing the product in accordance with the present invention, a super-saturated solution of sugar in water is prepared by dissolving the sugar in water which is heated to approximately 235° F., at which point the syrup boils. Heating of the syrup is then discontinued. The cocoa powder is added to the syrup, being thoroughly mixed therein and completely wetted or saturated therewith. Upon continued mixing of the cocoa powder in the syrup, the cocoa powder is gradually wetted down and the temperature of the mass drops to about 195° F. At this point the consistency of the material changes from that of a fairly fluid but viscous mass to one of a doughy consistency. This material is allowed to cool or is cooled to a temperature of about 115° F. at which temperature it can be readily crumbled, grated or forced through a sieve to produce the discrete particles of the desired size. More specifically, when the cocoa-sugar material attains its doughy consistency, said material is removed from the container and placed in a melangeur in which it is crumbled and broken up into small lumps or aggregates without, however, being pulverized. The crumbled material is then passed through a sieve of the proper mesh, say through a 30 or 40 mesh sieve, which is preferably agitated during the sieving operation, and thereafter the material can be regulated as to size by taking as the final product the particles which pass through the 30 or 40 mesh sieve but which do not pass through a finer sieve, say a 90 or 100 mesh sieve.

The following example illustrates a suitable formula of the ingredients and the proportions thereof for making the product of the present invention in accordance with the above described method:

| | Pounds |
|---|---|
| Pulverized cocoa of low fat content | 30 |
| Sugar (sucrose) | 70 |
| Water | 14 |
| Salt, natural and artificial flavors, condiments and vitamins. | |

The low proportion of water utilized in accordance with this method as described is indicated by the above formula, and we prefer to use about 14 pounds of water to 100 pounds of sugar and cocoa combined. Also, the preferred proportion of cocoa to sugar is substantially as indicated in the above formula, that is, about 30 pounds of cocoa to about 70 pounds of sugar. While the proportion of water to cocoa and sugar can be varied from that indicated, it is, nevertheless, important, pursuant to one of the features of the present invention, to utilize a low proportion of water whereby rapid crystallization of the sugar is obtained for the purpose of forming the sugar into small crystals. The flavoring ingredients are added to the sugar syrup after the heating thereof is discontinued, after which the cocoa powder is added as described above. The vitamins when incorporated in the product are added preferably after the cocoa is mixed into the sugar syrup and the temperature drops to or below 195° F.

The super-saturated sugar solution can be easily prepared, by using a steam jacketed kettle, provided with stirrers. The sugar can be of any suitable type as to degree of fineness and need not necessarily be white sugar. The cocoa powder can be added to the sugar syrup in the kettle and stirred into the syrup by the stirrers with which said kettle is provided. The cocoa-sugar mass is then preferably removed from the kettle in which the syrup is formed and is introduced into a mixer capable of mixing the material of the dough-like consistency referred to above, said mixer being provided with a steam jacket for maintaining the mass at a temperature of about 195° F. After this mass is thoroughly mixed in said mixer, it is removed therefrom and placed on a moving belt or trough where the mass can cool and crystallize, said mass being allowed to cool to a temperature of about 115° F. Then while said mass is maintained at said temperature of about 115° F., it is grated or crumbled in a suitable machine such, for example, as a melangeur which may be kept warm, after which the crumbled and rather lumpy material is sieved as described above. The crumbled sugar-cocoa material is warm and somewhat damp when it is subjected to the sieving action, and thereafter the cocoa product composed of small discrete particles of the desired size cools and dries. If desired, the cocoa powder can be added to the sugar syrup in the mixer rather than in the steam kettle, and it is also possible to eliminate the steam kettle and to produce the sugar syrup in the mixer.

Method II

In accordance with another method embodying the present invention, instead of adding the cocoa powder to the sugar syrup in a kettle or in a mixer as previously described, the cocoa powder can be placed in the melangeur and the sugar syrup prepared as described above is then mixed with the cocoa powder. The melangeur is operated until the crumbly material is obtained, after which the material is run through sieves of various sizes for obtaining a product of the desired particle size, that is, particles which pass through a 30 or 40 mesh sieve but not through a 90 or 100 mesh sieve.

Method III

In another method of making the cocoa product pursuant to the present invention, the cocoa powder of low fat content as described above is mixed and thoroughly blended with fine crystal sugar, which is available commercially or may be prepared by cracking or pulverizing regular granulated sugar, of a particle size which passes through a 30 mesh sieve and not through a 150 mesh sieve. This dry mixture of sugar and cocoa, preferably heated to about 120° F. to 150° F., is then placed in a mixing device, such as, for example, a melangeur also preferably heated to about 120° F. to 150° F. A relatively small quantity of water heated to a temperature of 120° F. to its boiling point is then added to said mixture of sugar and cocoa in the melangeur and the melangeur is operated to thoroughly mix the water with the sugar and cocoa and to triturate the material while the latter cools and until a crumbling mass is obtained. Then the crumbly material is passed through a coarse screen to facilitate further cooling and drying, after which the material is passed through finer screens or sieves to obtain a product of the desired particle size, more particularly a product composed of particles which pass through a 30 or 40 mesh screen but not through a 90 or 100 mesh screen. The proportion of cocoa powder to sugar may be the same as that already specified in Methods I and II, and likewise the quantity of water utilized is of the order hereinabove referred to, but is preferably somewhat less than that specified in Methods I and II. More specifically, in this method, about 10 pounds of water are added to the sugar cocoa mixture for each 100 pounds of said mixture.

Method IV

Another method of producing the cocoa product embodying the present invention comprises mixing the cocoa powder of low fat content with fine crystal sugar as hereinbefore described, preparing a sugar syrup as described above, and then mixing the sugar syrup with the dry cocoa-sugar mixture in a melangeur where the material is subjected to the action of the melangeur until a crumbling mass is obtained. Thereafter the material is passed through a coarse screen for facilitating the cooling and drying thereof after which the cool and dry material is sieved to obtain a product of the desired particle size, i. e., particles which pass through a 30 or 40 mesh sieve but do not pass through a 90 or 100 mesh sieve. In this method of producing the cocoa product the proportions of cocoa, sugar, and water are substantially the same as those indicated in Methods I, II and III. More particularly, by way of example, 28 pounds of fine crystal sugar as described in Method III are mixed and blended with 30 pounds of powdered cocoa of the above described low fat content. The mixture is placed in the melangeur, and to said dry cocoa-sugar mixture are added 52 pounds of sugar syrup consisting of 42 pounds of sugar dissolved in 10 pounds of water, said sugar syrup being added while the latter is hot, i. e., at a temperature of about 230° F., and before the dissolved sugar crystallizes, the proportion of sugar and cocoa mixture to water being preferably about 10 pounds of water to 100 pounds of the total cocoa and sugar mass.

The cocoa product produced by the above described methods possesses the above described properties and characteristics. Said product is in the form of small crystallized particles of irregular shape consisting of cocoa matter interlaced with small sugar crystals. Said product is stable, non-hygroscopic and free-flowing and can be readily dissolved in cold milk or other liquid for preparing a cold beverage. The product has been found readily soluble in milk or other potable liquids at a temperature of 45° F. or less and, in the mixing of the product with the milk or other potable liquids, the particles are easily wetted by the liquid and readily mixed therein without agglomeration of the particles. Thereafter, the product remains in solution or suspension without stirring or forming a sediment except after a substantial period of time without intermediate mixing. It is to be understood that while the product of this invention possesses the important property of being readily wettable and soluble in cold liquids and is, therefore, especially useful for preparing cold beverages, said product is also readily wettable and soluble in warm or hot liquids and is, therefore, equally well adapted for use in the preparation of warm or hot drinks. The product mixed with milk or milk enriched with cream has been found to produce a very palatable beverage.

While we have described the product and methods of the present invention more or less specifically, it will be understood that certain variations may be made therein and will occur to skilled artisans in view of the present disclosure. Therefore, we do not wish to be limited to the invention as hereinbefore specifically described except to the extent which may be required by the scope of the appended claims.

Having thus described our invention, what we claim and desire to secure by Letters Patent is:

1. The method which comprises mixing cocoa powder having a butter fat content not substantially exceeding about 2% with fine granulated sugar, adding a solution of sugar in heated water to said mixture of cocoa powder and sugar and thoroughly mixing the same together, while permitting the material to cool, until a crumbling mass is obtained, and then reducing said crumbling mass to the form of small discrete particles.

2. The method which comprises preparing a sugar syrup by dissolving sugar in heated water in such proportion of sugar to water that the sugar crystallizes rapidly when the temperature of said syrup is lowered, mixing cocoa powder having a butter fat content of less than 2% with said syrup while the latter is in heated condition and before the sugar crystallizes, allowing said sugar-cocoa mixture to cool to a temperature at which it crumbles, and reducing said crumbly material to the form of small discrete particles.

3. The method which comprises preparing a sugar syrup by dissolving sugar in heated water in such proportion of sugar to water that the sugar crystallizes rapidly when the temperature of said syrup is lowered, mixing cocoa powder having a butter-fat content not substantially exceeding about 2% with said syrup while the latter is in heated condition and before the sugar crystallizes, allowing said sugar-cocoa mixture to cool to a temperature at which it crumbles, and then reducing said crumbly material to the form of small discrete particles.

4. A sweetened cocoa product in the form of small free-flowing discrete particles, said product comprising small sugar crystals and cocoa powder having a fat content not substantially exceeding about 2%, said crystals being interlaced with the cocoa matter in said particles, said product being non-hygroscopic and readily soluble in cold milk.

5. A sweetened cocoa product in the form of small free-flowing discrete particles, said product comprising small sugar crystals and cocoa powder having a fat content less than about 2%, said crystals being interlaced with the cocoa matter in said particles, said product being non-hygroscopic and readily soluble in cold milk.

6. A sweetened cocoa product in the form of small free-flowing discrete particles, said product comprising small sugar crystals and cocoa powder having a fat content not substantially exceeding about 2%, said crystals being interlaced with the cocoa matter in said particles, said product being non-hygroscopic and readily soluble in cold milk, said particles being in the range of about 30 to 100 sieve-mesh size.

7. A sweetened cocoa product in the form of small free-flowing discrete particles, said product comprising small sugar crystals and cocoa powder having a fat content less than about 2%, said crystals being interlaced with the cocoa matter in said particles, said product being non-hygroscopic and readily soluble in cold milk, said particles being in the range of about 30 to 100 sieve-mesh size.

8. The method which comprises forming a mixture of sugar, powdered cocoa and heated water, said powdered cocoa having a cocoa butter fat content not exceeding about 2%, stirring said mixture and rubbing the ingredients thereof together while said mixture cools and until a crumbling material is obtained, and then reducing said crumbling material to the form of small discrete particles of a predetermined size range.

9. The method which comprises forming a mixture of sugar, powdered cocoa and heated water, said powdered cocoa having a cocoa butter fat content not exceeding about 2%, and the quantity of water being low in relation to the total quantity of sugar and cocoa, stirring said mixture and rubbing the ingredients thereof together while said mixture cools and until a crumbling material is obtained, and then reducing said crumbling material to the form of small discrete particles of a predetermined size range.

CARTER F. JONES.
WALTER TRESPER CLARKE.
BENJAMIN J. ZENLEA.